(12) United States Patent
Rammer et al.

(10) Patent No.: US 9,938,909 B2
(45) Date of Patent: *Apr. 10, 2018

(54) METHOD FOR CONTROLLING AN ENGINE BRAKING DEVICE AND ENGINE BRAKING DEVICE

(71) Applicant: MAN Truck & Bus Österreich AG, Steyr (AT)

(72) Inventors: Franz Rammer, Wolfern (AT); Heidrun Klinger, Steyr (AT); André Kreuzriegler, Reichraming (AT)

(73) Assignee: MAN TRUCK & BUS ÖSTERREICH AG, Steyr (AT)

( * ) Notice: Subject to any disclaimer, the term of this patent is extended or adjusted under 35 U.S.C. 154(b) by 165 days.

This patent is subject to a terminal disclaimer.

(21) Appl. No.: 14/966,417

(22) Filed: Dec. 11, 2015

(65) Prior Publication Data

US 2016/0169127 A1 Jun. 16, 2016

(30) Foreign Application Priority Data

Dec. 15, 2014 (AT) .................................. A 910/2014

(51) Int. Cl.
*F02D 1/00* (2006.01)
*F02D 13/04* (2006.01)
(Continued)

(52) U.S. Cl.
CPC .............. *F02D 13/04* (2013.01); *F01L 13/06* (2013.01); *F02B 37/02* (2013.01); *F02B 37/18* (2013.01);
(Continued)

(58) Field of Classification Search
CPC ........... F01L 13/06; F01L 13/08; F02D 13/04; F02D 41/12
(Continued)

(56) References Cited

U.S. PATENT DOCUMENTS 5,150,678 A 9/1992 Wittmann
6,085,526 A 7/2000 Bischoff
(Continued)

FOREIGN PATENT DOCUMENTS

DE 19637999 A1 3/1998
DE 19808832 A1 9/1999
(Continued)

*Primary Examiner* — John Kwon
(74) *Attorney, Agent, or Firm* — Lucas & Mercanti, LLP

(57) ABSTRACT

The invention relates to a method for controlling an engine braking device for a combustion engine in motor vehicles, wherein the engine braking device has an intake system, an exhaust system, gas exchange valves associated with the combustion engine, exhaust turbo-charging by at least one exhaust turbocharger integrated into the exhaust system and the intake system, and an engine braking unit, wherein the engine braking unit has a decompression brake, which influences at least one outlet valve of the gas exchange valves and is dependent on the exhaust gas backpressure, and a brake flap, which is arranged in the exhaust system. To achieve a precisely controllable engine braking power in the engine braking mode, the demanded braking torque is controlled in accordance with the boost pressure of the exhaust turbocharger and with the exhaust gas backpressure upstream of the brake flap, which is arranged directly upstream of an exhaust turbine of the exhaust turbocharger. A suitable engine braking device is furthermore proposed.

17 Claims, 3 Drawing Sheets

(51) Int. Cl.
*F02B 37/02* (2006.01)
*F02B 37/18* (2006.01)
*F02B 37/22* (2006.01)
*F01L 13/06* (2006.01)
*F02D 9/06* (2006.01)
*F02M 26/05* (2016.01)

(52) U.S. Cl.
CPC .............. *F02B 37/22* (2013.01); *F02D 9/06* (2013.01); *F02M 26/05* (2016.02); *Y02T 10/144* (2013.01)

(58) Field of Classification Search
USPC .......... 123/320–323, 330, 345–348; 60/602, 60/605.2
See application file for complete search history.

(56) References Cited

U.S. PATENT DOCUMENTS

| | | | |
|---|---|---|---|
| 6,155,049 A | 12/2000 | Bischoff | |
| 6,497,097 B2 | 12/2002 | Schmidt et al. | |
| 7,523,736 B2 | 4/2009 | Rammer | |
| 8,225,769 B2 | 7/2012 | Dilly | |
| 8,931,456 B2 | 1/2015 | Rammer et al. | |
| 2007/0150154 A1* | 6/2007 | Lenz | F02D 41/0005 701/54 |
| 2007/0234984 A1* | 10/2007 | Kolmanovsky | F01L 9/04 123/90.15 |
| 2007/0234985 A1* | 10/2007 | Kolmanovsky | F01L 9/04 123/90.15 |
| 2007/0235005 A1* | 10/2007 | Lewis | F01L 9/04 123/322 |
| 2009/0018756 A1* | 1/2009 | Storhok | F02D 41/0007 701/105 |
| 2014/0195134 A1* | 7/2014 | Maier | F02B 37/004 701/101 |

FOREIGN PATENT DOCUMENTS

| | | |
|---|---|---|
| DE | 19814572 | 10/1999 |
| EP | 1258603 A1 | 11/2002 |
| EP | 1801392 A2 | 6/2007 |
| EP | 2412955 A1 | 2/2012 |

* cited by examiner

METHOD FOR CONTROLLING AN ENGINE BRAKING DEVICE AND ENGINE BRAKING DEVICE

CROSS-REFERENCE TO RELATED APPLICATIONS

The present application claims priority of A 910/2014 filed Dec. 15, 2014, which is incorporated herein by reference.

BACKGROUND OF THE INVENTION

The present invention relates to a method for controlling an engine braking device for a combustion engine in motor vehicles, in particular in commercial vehicles, to an engine braking device, and to a vehicle having the engine braking device.

In air-compressing (diesel) combustion engines in commercial vehicles, there is a known practice of producing an exhaust gas backpressure in the exhaust system using a brake flap in the overrun mode, the backpressure bringing about effective engine braking since the pistons of the combustion engine operate against this exhaust gas pressure during the exhaust stroke (outlet valves open).

In order significantly to increase the effect of such an engine braking device, there is a practice known from U.S. Pat. No. 8225769 B2 for example, of additionally providing a decompression brake, where, in addition to regular valve actuation in accordance with the four-stroke principle, the outlet valves are also partially open during the compression stroke. Here, the additional braking effect arises from the throttled discharge of the combustion air into the exhaust system.

In the case of an exhaust-controlled decompression brake, the valve timing of the outlet valves is configured in such a way that the outlet valves open irregularly in a specifically intended manner owing to the exhaust gas backpressure present when the brake flap is closed ("valve jumping") and are held open by a mechanism until the next regular valve opening. In this case, the use of the decompression brake is dependent on or triggered by the input exhaust gas backpressure.

BRIEF SUMMARY OF THE PRESENT INVENTION

An object of the invention is to provide a method and an engine braking device for effecting open-loop and/or closed-loop control in the case of a combustion engine with exhaust turbo-charging to produce a variable engine braking power.

The object is met by a method for controlling an engine braking device for a combustion engine in motor vehicles, in particular in commercial vehicles, wherein the engine braking device has an intake system, an exhaust system, gas exchange valves associated with the combustion engine (preferably gas exchange valves controlled according to the four-stroke principle), an exhaust turbocharger integrated into the exhaust system and the intake system, and an engine braking unit, wherein the engine braking unit has a decompression brake, which influences at least one outlet valve of the gas exchange valves and is, in particular, gas-controlled and/or dependent on the exhaust gas backpressure, and a brake flap, which is arranged in the exhaust system and causes the exhaust gas to build up. According to the invention, it is proposed that, in the engine braking mode, the demanded braking torque is controlled in accordance with the boost pressure of the exhaust turbocharger and with the exhaust gas backpressure upstream of the brake flap, which is preferably arranged upstream of an exhaust turbine of the exhaust turbocharger. It has been recognized that the exhaust gas backpressure as an available control variable for selectively activating the decompression brake on the basis of the variation in the pressure conditions due to the boost pressure of a pressure-charged combustion engine is not sufficient to ensure selective initiation or control of the decompression brake or of the respectively demanded braking power in the engine braking mode. Only linking the exhaust gas backpressure with the instantaneously prevailing boost pressure provides a reliable control variable for precise control of the decompression brake.

In an advantageous specific development of the invention, it is proposed that at least the boost pressure (PL) and a differential pressure (PD) are used as control variables, wherein the differential pressure (PD) is formed from the exhaust gas backpressure (PA) and the boost pressure (PL) as PA−PL=PD. Since the mechanism of the gas-pressure-controlled decompression brake is not directly dependent on the exhaust gas backpressure but on the pressure difference between the exhaust gas backpressure (PA) and the boost pressure (PL), it is advantageously possible, the control according to the invention, to ensure precise control of the decompression brake over the entire operating range of the engine braking unit, including different braking power demands.

In an advantageous configuration of the control parameters, the braking torque is controlled with only a controlled brake flap in a first phase, with an incipient decompression brake in a transitional phase and with the decompression brake and the brake flap to produce a maximum possible braking power in a final phase.

It is furthermore also possible, with a boost pressure rising in the engine braking mode, for the exhaust gas backpressure PA to be increased by predefined increasing closure of the brake flap, which is preferably arranged upstream of an exhaust turbine of the exhaust turbocharger, in order to input a defined differential pressure. The setpoint value of the boost pressure can furthermore be calculated by a characteristic map, which is plotted using the speed of the combustion engine and the demanded engine braking torque.

It is furthermore possible, in a way which is advantageous in terms of control engineering, for the setpoint value of the differential pressure to be determined by a main characteristic map, which is plotted using the speed of the combustion engine and the actual boost pressure, and furthermore by a lowering characteristic map, which is plotted using the speed of the combustion engine and the engine braking demand. The dependence of the main characteristic map on the actual boost pressure is advantageous since a rising differential pressure may also be required with a rising boost pressure in order to bring about gas-pressure-controlled valve opening. The lowering characteristic map, on the other hand, has the task of reducing the differential pressure, even in the case of partial braking torque demands.

More specifically, the actual differential pressure value is furthermore preferably set in accordance with the setpoint differential pressure value and the position of the engine braking flap.

Finally, it can be advantageous if an actual boost pressure value is set during an engine braking operation using the setpoint boost pressure value determined and a control member on the exhaust turbine, the actual value, in turn, influencing the demanded engine braking power or the use of the decompression brake in a specifically intended manner in conjunction with the differential pressure value PD. In a manner known per se, the control member on the exhaust turbocharger can be a bypass valve (waste gate) and/or a flow guiding element of an exhaust turbocharger, in particular a flow guiding element of an exhaust turbine with variable turbine geometry. Control of a throttle valve provided in the intake system of the combustion engine may also be advantageous.

In an engine braking device according to the invention, it is envisaged that the brake flap in the exhaust system and the boost pressure in the intake system of the combustion engine are controlled in the engine braking mode by a boost pressure controller, which is dependent on the demanded braking power, and by a differential pressure controller, which forms a differential pressure from the exhaust gas backpressure and the boost pressure. The advantages already described above in connection with the procedure according to the invention are thereby obtained.

Also in the case of the engine braking device according to the invention, the brake flap is preferably arranged upstream of an exhaust turbine of the exhaust turbocharger, most preferably directly upstream of and adjacent to the exhaust turbine, and thus forms a flow guiding flap which (positively) influences gas admission to the exhaust turbine. It is thereby possible to greatly increase the inlet-side boost pressure in the engine braking mode, virtually without additional outlay on construction, and thus to increase the mass flow required in the combustion engine for the achievable braking power. The brake flap thus performs several functions simultaneously: it ensures, preferably under closed-loop control, a sufficient exhaust gas backpressure and additionally ensures advantageous inflow to the turbine with a reduced exhaust gas flow rate and lower exhaust gas enthalpy, similarly to the operation of a control flap on exhaust turbines with variable turbine geometry. More specifically, in contrast to a brake flap arranged downstream of the exhaust turbine, the brake flap arranged upstream of the exhaust turbine (preferably directly upstream of and adjacent to the exhaust turbine) here brings about a higher pressure gradient across the exhaust turbine, as a result of which, due to the higher mass flow and volume flow which is then possible through the exhaust turbine, the boost pressure and the exhaust gas backpressure can be significantly increased and thus also the engine braking power can be significantly increased in a functionally reliable manner without thermal overloading of the combustion engine. By virtue of the pressure gradient across the brake flap arranged upstream, lower loading of the exhaust turbine is achieved here for the same exhaust gas backpressure, and hence this leads to the desired increase in braking power with an increase in the exhaust gas backpressure, without higher loading of the exhaust turbine.

In one embodiment, the brake flap is arranged upstream of and outside, preferably directly upstream of and outside, a turbine housing of an exhaust turbine of the exhaust turbocharger (and therefore upstream of an inflow duct of the turbine housing). Through the arrangement of the at least one brake flap upstream of and hence outside a turbine housing or an inflow duct of the exhaust turbine, the flap does not form a component of the exhaust turbine, this resulting in positioning of the brake flap for easy assembly with increased degrees of freedom in terms of design. In particular, it is then possible here to avoid structural modifications to the exhaust turbine, and there is no need to stock a large number of different turbines for different model series. According to a specific first embodiment that is particularly preferred for this purpose, the exhaust turbine, in particular a turbine housing of the exhaust turbine, can then be coupled fluidically here to an exhaust manifold, to which the exhaust gas is admitted via at least one, preferably a plurality of, cylinders of the combustion engine, wherein a separate module having the brake flap is installed between the exhaust turbine and the exhaust manifold, in particular between a turbine housing of the exhaust turbine and the exhaust manifold and hence directly upstream of and outside a turbine housing of the exhaust turbine, the module being firmly connected both to the turbine housing and to the exhaust manifold. In a manner which is particularly compact and advantageous in terms of construction, provision is made, according to a second specific embodiment, for the exhaust turbine or an exhaust turbine housing of the exhaust turbocharger to be mounted directly on an exhaust manifold, to which the exhaust gas is admitted via at least one, preferably a plurality of, cylinders of the combustion engine, wherein the brake flap is arranged in the region of the exhaust manifold and hence directly upstream of and outside a turbine housing of the exhaust turbine.

Moreover, according to another embodiment, a control member which influences the boost pressure in the intake system is provided. The control member which influences the boost pressure in the intake system can be a bypass valve and/or a flow guiding element of an exhaust turbine, for example, provided on the exhaust turbine of the exhaust turbocharger, in particular a flow guiding element of an exhaust turbine with variable turbine geometry, and/or a throttle valve in the intake system of the combustion engine.

Finally, the setpoint values of the boost pressure controller and/or of the differential pressure controller can be stored in characteristic maps, which are derived in accordance with at least the speed of the combustion engine, with the braking power demand and with pressure values of the boost pressure in the intake system and of the exhaust gas backpressure in the exhaust system of the combustion engine.

The term "brake flap" used in the present application should expressly be understood in a broad and comprehensive sense and is not limited only to pivotable flap arrangements. Thus, where not explained otherwise, the term "brake flap" is also expressly intended to include any other suitable and/or non-pivotable throttling devices, e.g., slides or rotary slides.

As regards the advantages obtained by the procedure according to the invention and the vehicle according to the invention, attention is drawn to the remarks made above. An illustrative embodiment of the invention is explained below more specifically with reference to the attached schematic drawing, in which:

DETAILED DESCRIPTION OF THE PREFERRED EMBODIMENTS

Figure 1:
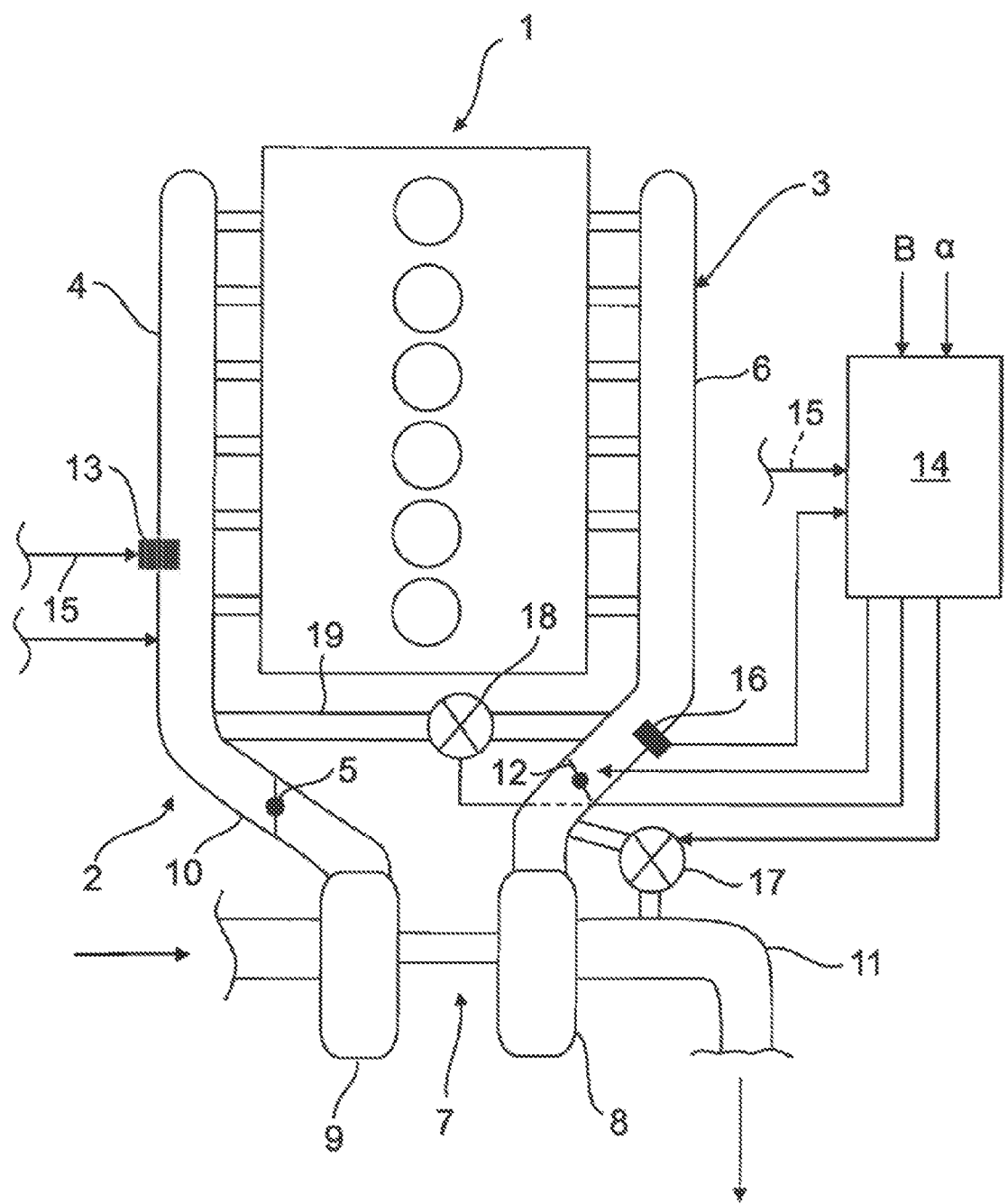
FIG. 1 shows, in a purely schematic, simplified illustration, a combustion engine for a commercial vehicle, having an intake system, an exhaust system, an exhaust turbocharger and an engine braking device having a gas-controlled decompression brake and a brake flap upstream of the exhaust turbine, wherein the devices are controlled in the engine braking mode by an electronic engine control unit having a boost pressure controller and a differential pressure controller.

A combustion engine 1 (e.g., a six-cylinder diesel combustion engine), in particular for a commercial vehicle, having an intake system 2 and an exhaust system 3 (of conventional construction where not described) is shown in a purely schematic way in FIG. 1. A throttle valve 5 can optionally be provided in the intake manifold 4 of the intake system 2.

The exhaust system 3 has an exhaust manifold 6, which is connected to the combustion chambers of the combustion engine 1 and is connected directly or indirectly to the exhaust turbine 8 of an exhaust turbocharger 7. The exhaust turbine 8 drives a compressor 9 in a known manner, the compressor being connected, in turn, to the intake manifold 4 by a line 10 and delivering combustion air at a defined boost pressure PL to the combustion chambers of the combustion engine 1. The exhaust gas flowing out via the exhaust manifold 6 and the exhaust turbine 8 is carried away further by an exhaust line 11. The other lines of the intake system 2 and of the exhaust system 3 of the combustion engine 1 in the motor vehicle are not shown.

As an engine braking device, the combustion engine 1 has a decompression brake (not shown), which acts on the gas exchange valves or outlet valves of the combustion engine 1.

A brake flap 12 that produces a defined exhaust gas backpressure PA is furthermore provided upstream of the exhaust turbine 8.

The decompression brake can be initiated in a known manner under gas control by the increased exhaust gas backpressure PA when the brake flap 12 is at least partially closed, at which pressure "fluttering" or "valve jumping" of the outlet valves is selectively triggered (e.g., U.S. Pat. No. 8,225,769 B2).

The exhaust-controlled decompression brake may include the decompression brake disclosed in U.S. Pat. No. 8,225,769 B2 or U.S. Pat. No. 5,150,678.

Arranged in the intake manifold 4 is a boost pressure sensor 13 that detects boost pressure PL and feeds the detected boost pressure PL to an engine control unit 14 (which will be described below) via a signal line 15. A pressure sensor 16 which measures the exhaust gas backpressure PA upstream of the brake flap 12 and feeds the values to the control unit 14 via a signal line, is furthermore inserted in the exhaust manifold 6.

Moreover, a signal B, which corresponds to the initiation of an engine braking operation in the overrun mode of the commercial vehicle, and a load signal a are fed to the control unit 14. The signal B is output by an engine braking management system (not shown), which demands a variable engine braking power.

The control unit 14 controls a bypass valve 17 on the exhaust turbine 8 of the exhaust turbo-charger 7 and an exhaust gas recirculation valve 18 in a line 19 arranged between the intake system 2 and the exhaust system 3, based on operation-specific stipulations relating to the engine power and to exhaust emissions of the combustion engine 1.

Apart from the known functions in the fired driving mode of the combustion engine 1, the electronic control unit 14 is modified such that, when the overrun mode is detected and there is an engine braking signal B, the brake flap 12 closes to a greater or lesser extent in order to input a defined exhaust gas backpressure PA and furthermore controls the boost pressure PL.

Figure 2:
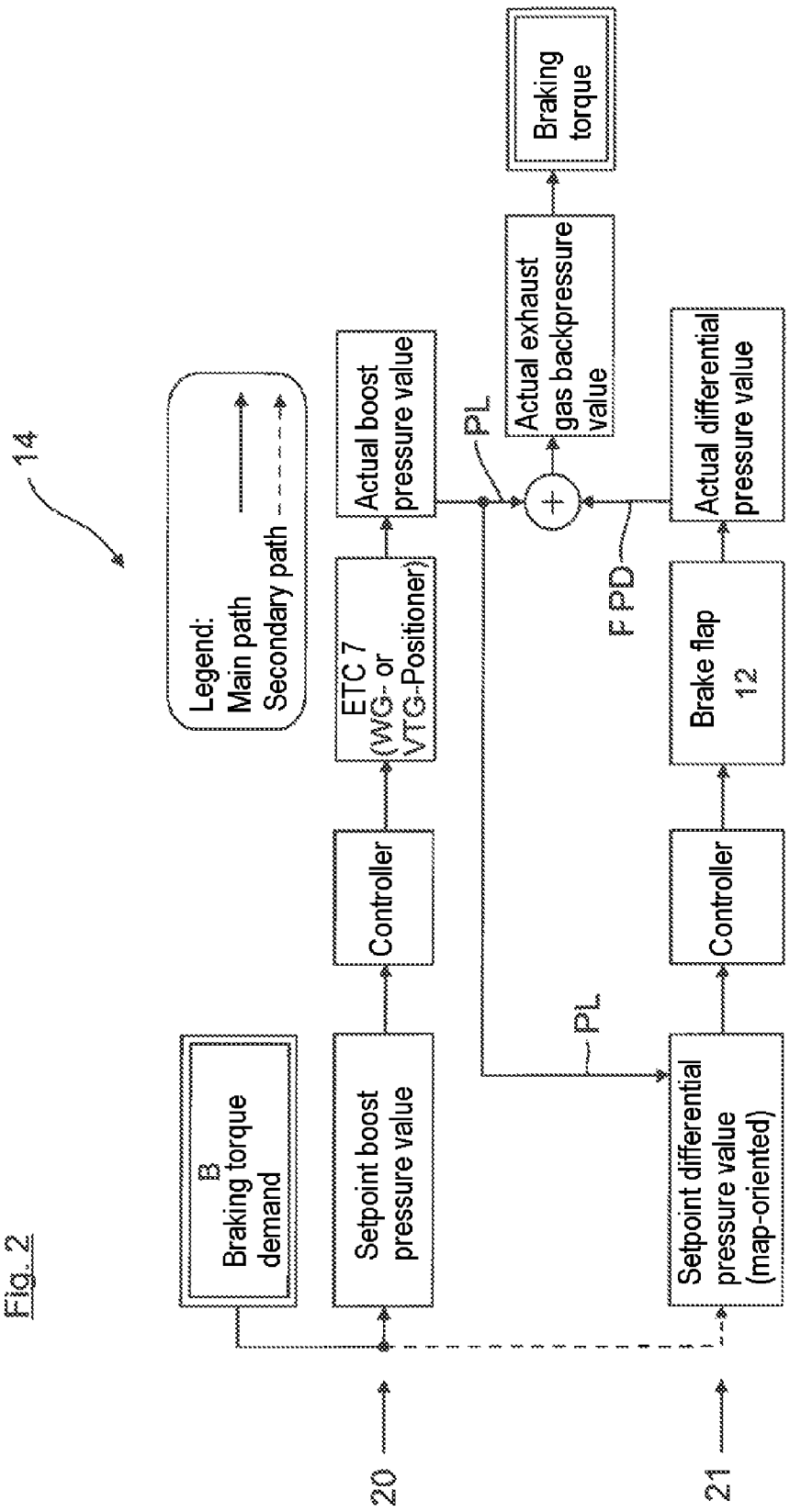
FIG. 2 shows a simplified block diagram of the closed-loop control of the engine braking device according to FIG. 1 having the boost pressure controller and the differential pressure controller for inputting a defined exhaust gas backpressure.

For this purpose, a boost pressure controller 20 and a differential pressure controller 21, illustrated in simplified form in FIG. 2, are provided in the control unit 14. These controllers 20, 21 determine the braking power in the engine braking mode B by controlling the brake flap 12 and the control members (bypass valve 17 for reducing the boost pressure PL and/or a flow guiding flap for increasing the boost pressure and/or the throttle flap 5 in the intake system 2).

Figure 4:
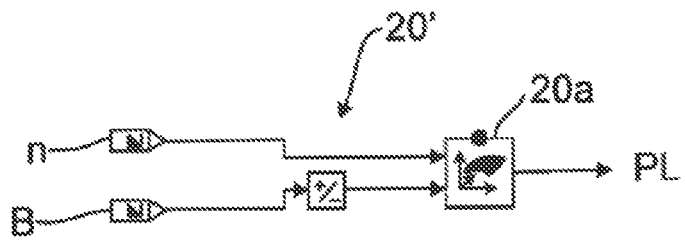
FIG. 4 shows a schematic illustration of the formation of the setpoint boost pressure value in the boost pressure controller.

FIG. 4 shows schematically a setpoint boost pressure value former 20' in connection with the boost pressure controller 20. Here, the setpoint boost pressure value is preferably determined by a characteristic map 20a (only indicated), which is formed by the speed n of the combustion engine and the demanded braking torque B. The actual boost pressure value PL is set by control intervention into one or more of the control members.

Figure 5:
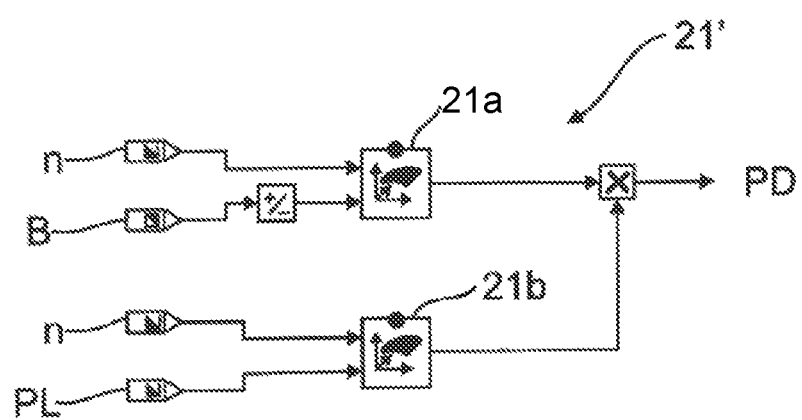
FIG. 5 shows another schematic illustration of the formation of the setpoint differential pressure value in the differential pressure controller for controlling the engine braking unit according to FIGS. 1 and 2.

FIG. 5 shows a setpoint differential pressure value former 21' in connection with the differential pressure controller 20, in which two characteristic maps 21a, 21b are preferably provided, which are linked mathematically (by control engineering or electronic means) to form the differential pressure PD.

As illustrated in FIG. 5, a setpoint differential pressure value is formed by a main characteristic map 21b, plotted using the speed n and the actual boost pressure value PL. The differential pressure PD in the case of partial braking torque demands is furthermore reduced by defined factors using a lowering characteristic map 21a, plotted using the speed n and the braking torque demand B.

Figure 3:
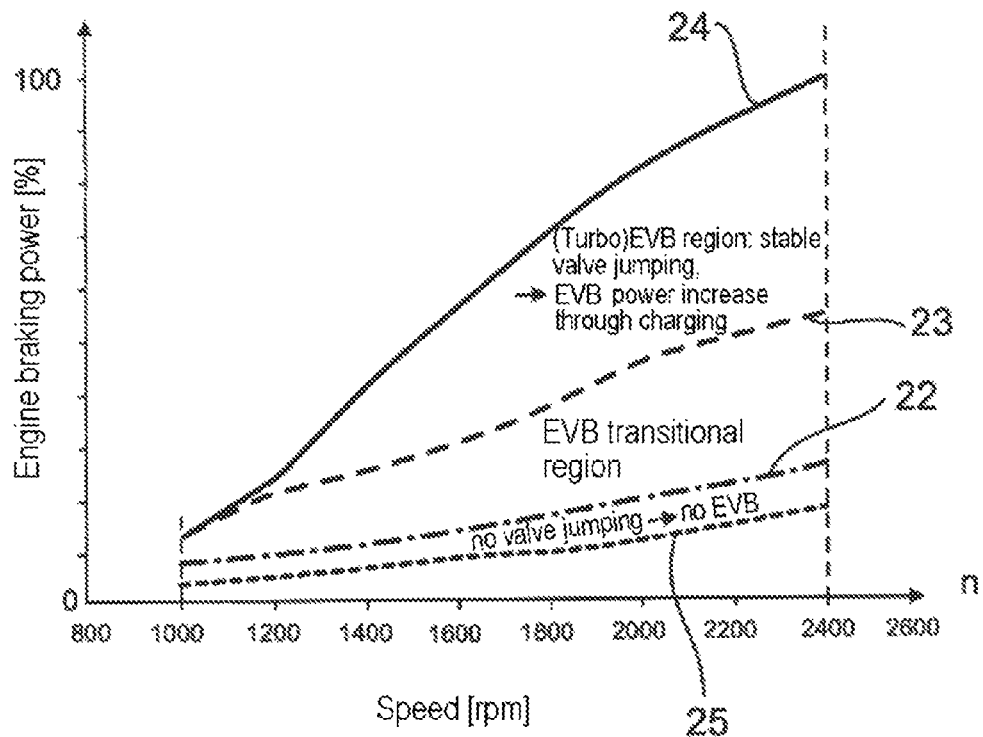
FIG. 3 shows a diagram of the braking power of the combustion engine which can be controlled or set by the closed-loop control system according to FIG. 2, plotted against speed.

By evaluating the pressure values PL and PD thus formed, it is possible to precisely set the exhaust gas backpressure PA relevant to the engine braking power such that, as illustrated in FIG. 3, against engine speed n, a lower curve 22 for a lower engine braking power with the decompression brake not activated, a central curve 23 for a transitional region with an incipient decompression brake, and an upper curve 24 for maximum engine braking power can be selectively controlled or set. Of course, also intermediate regions between the individual curves may be selectively controlled or set. Here, the lowermost curve 25 represents the drag power with which the combustion engine is taken along when the brake flap is fully open.

The dependence of the setpoint exhaust gas backpressure PA on the actual boost pressure value PL ensures that, as the boost pressure PL rises, the differential pressure PD also increases, thereby ensuring the gas-controlled valve opening of the outlet valves in a reliable process. The transitional region from exhaust gas buildup alone, via the brake flap 12, to the decompression brake in addition can furthermore be managed more effectively, wherein the different pressure conditions during gas exchange in the combustion engine 1 can be better taken into account in the engine braking mode.

The boost pressure PL in the engine braking mode B can be reduced (e.g. in the region of curve 22 in FIG. 3) or increased (e.g., curve 24 in FIG. 3) in accordance with the demanded braking power by the control members for inputting the actual boost pressure. As explained above, this is achieved by control of the throttle valve 5 in the intake system 2 and/or of the bypass valve 17 on the exhaust turbocharger 7 and/or, for example, by control of a flow guiding flap upstream of the exhaust turbine 8. If appropriate, the brake flap 12 could also be used in conjunction with a flow guiding flap in an exhaust turbocharger 7 with variable turbine geometry.

The invention is not restricted to the illustrative embodiment shown. For example, the combustion engine 1 could also be embodied with sequential pressure charging with two exhaust turbochargers 7 arranged in series, the first of which can be selected as a high-pressure stage and the second of which can be selected as a low-pressure stage.

LIST OF REFERENCE SIGNS

1 combustion engine
2 intake system
3 exhaust system
4 intake manifold
5 throttle valve
6 exhaust manifold
7 exhaust turbocharger
8 exhaust turbine
9 compressor
10 intake line
11 exhaust line
12 brake flap
13 boost pressure sensor
14 control unit
15 signal line
16 pressure sensor
17 bypass valve
18 exhaust gas recirculation valve
19 line
20 boost pressure controller
20a characteristic map
21 differential pressure controller
21a characteristic map
21b characteristic map
22 to 24 braking power curves
25 drag power curve
20' setpoint boost pressure value former
21' setpoint differential pressure value former

The invention claimed is:

1. A method for controlling an engine braking device for a combustion engine in a motor vehicle, the engine braking device having an intake system, an exhaust system, gas exchange valves associated with the combustion engine, an exhaust turbocharger integrated into the exhaust system and the intake system, and an engine braking unit, wherein the engine braking unit has a decompression brake, which influences at least one outlet valve of the gas exchange valves and is at least one of gas-controlled and dependent on the exhaust gas backpressure, and a brake flap, which is arranged in the exhaust system upstream of an exhaust turbine of the exhaust turbocharger and causes the exhaust gas to build up, the method comprising the steps of:
    entering an engine braking mode; and
    controlling a demanded braking torque in the engine braking mode in accordance with a boost pressure of the exhaust turbocharger and with the exhaust gas backpressure upstream of the brake flap.

2. The method according to claim 1, wherein at least the boost pressure and a differential pressure are used as control variables in the step of controlling, the differential pressure being formed from the exhaust gas backpressure and the boost pressure.

3. The method according to claim 1, wherein the braking torque is controlled with only the brake flap in a first phase, with the decompression brake in a transitional phase, and with the decompression brake and the brake flap in a final phase such that a maximum possible braking torque is achieved in the final phase.

4. The method according to claim 1, wherein, with a boost pressure rising in the engine braking mode, the step of controlling includes increasing the exhaust gas backpressure by predefined increasing closure of the brake flap to input a defined differential pressure.

5. The method according to claim 1, further comprising calculating a setpoint value of the boost pressure using a characteristic map, which is plotted using a speed of the combustion engine and the demanded engine braking torque.

6. The method according to claim 1, further comprising calculating a setpoint value of the differential pressure by a main characteristic map, which is plotted using the speed of the combustion engine and an actual boost pressure, and by a lowering characteristic map, which is plotted using the speed of the combustion engine and the engine braking demand.

7. The method according to claim 1, further comprising setting the actual differential pressure value in accordance with the setpoint differential pressure value and the position of the engine braking flap.

8. The method according to claim 1, further comprising setting an actual boost pressure value during an engine braking operation by the setpoint boost pressure value determined and by at least one control member on one of the exhaust turbine and in the intake system.

9. An engine braking device for a combustion engine in a motor vehicle, comprising:
    an intake system, an exhaust system, gas exchange valves associated with the combustion engine, an exhaust turbocharger integrated into the exhaust system and the intake system, and an engine braking unit, and wherein the engine braking unit has a decompression brake, which influences at least one outlet valve of the gas exchange valves and is at least one of gas-controlled and dependent on exhaust gas back-pressure, and a brake flap, which is arranged in the exhaust system upstream of an exhaust turbine of the exhaust turbocharger and causes the exhaust gas to build up,
    a boost pressure controller controlling the brake flap and the boost pressure in the intake system of the combustion engine in the engine braking mode based on the demanded braking power, and
    a differential pressure controller controlling the brake flap and the boost pressure in the intake system to form a differential pressure from the exhaust gas backpressure and the boost pressure.

10. The engine braking device according to claim 9, further comprising at least one control member that influences the boost pressure in the intake system.

11. The engine braking device according to claim 10, wherein the at least one control member includes at least one of a bypass valve of the exhaust turbocharger and a flow guiding element of the exhaust turbine that influences the boost pressure in the intake system.

12. The engine braking device according to claim. 11, wherein the at least one control member includes a flow guiding element of an exhaust turbine with variable turbine geometry.

13. The engine braking device according to claim 10, wherein the at least one control member is a throttle valve in the intake system of the combustion engine.

14. The engine braking device according to claim 9, wherein setpoint values of at least one of the boost pressure controller and of the differential pressure controller is stored in a characteristic map, which is formed in accordance with the speed of the combustion engine and at least one of the braking power demand and pressure values of the boost pressure in the intake system.

15. The engine braking device according to claim 9, wherein setpoint values of the boost pressure controller and of the differential pressure controller is stored in characteristic maps, which are formed in accordance with the speed of the combustion engine and at least one of the braking power demand and pressure values of the boost pressure in the intake system.

16. A vehicle having an engine braking device according to claim 9.

17. A vehicle having an engine braking device for carrying out a method according to claim 1.

* * * * *